Patented June 12, 1934

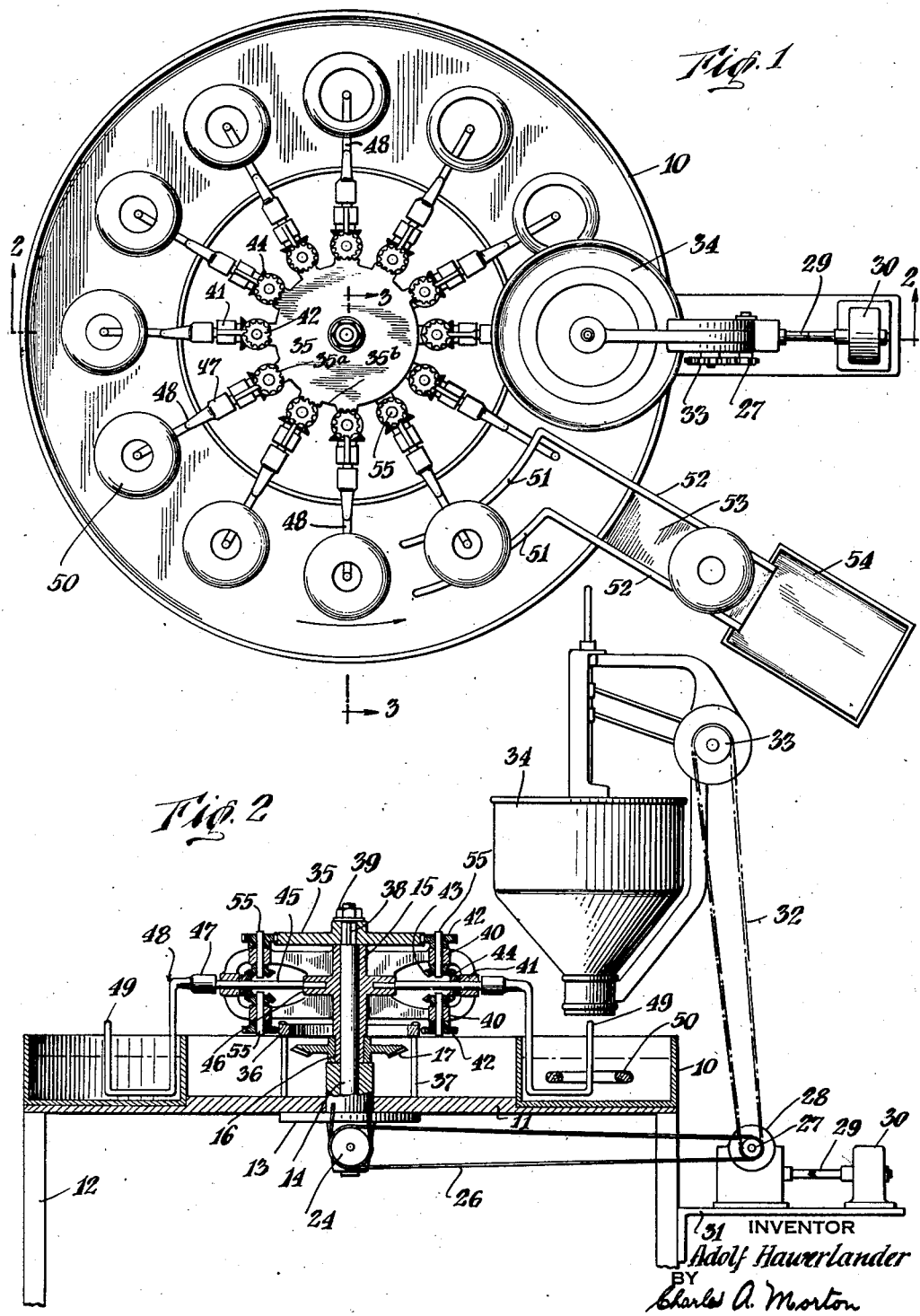

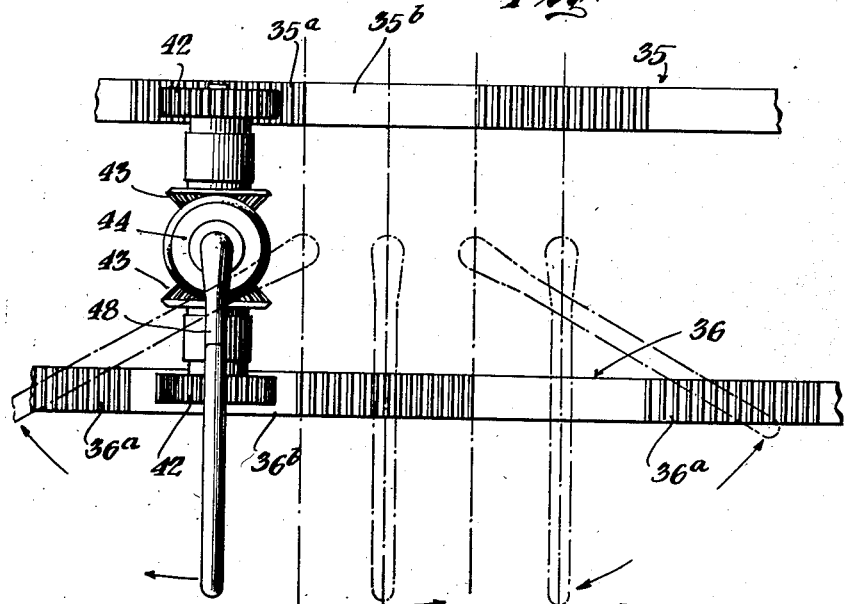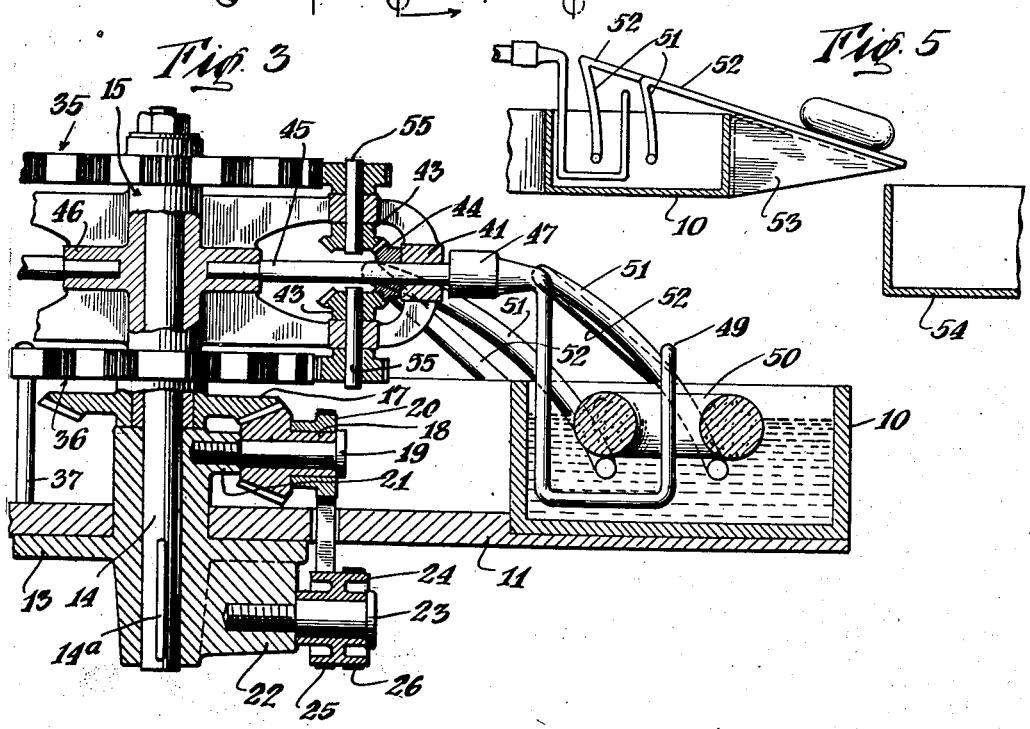

1,962,714

UNITED STATES PATENT OFFICE 1,962,714

DOUGHNUT MACHINE

Adolf Hawerlander, New York, N. Y., assignor to Joe Lowe Corporation, Brooklyn, N. Y., a corporation of Delaware Application May 4, 1933, Serial No. 669,360

10 Claims. (Cl. 53—7)

This invention relates to new and useful improvements in doughnut machines.

Hitherto it has been customary in cooking doughnuts by what is known as the flotation method to deposit the doughnuts in the cooking receptacle containing hot grease wherein the doughnuts are first submerged and thereafter permitted to float in a partially submerged condition due to their natural buoyancy, the volume of doughnut exposed above the grease increasing as the cooking operation progresses. As the exposed portion of doughnuts so cooked is raw and inedible, it is necessary to turn them over after the same have been partially cooked whereby the portion formerly exposed becomes the underside and is cooked accordingly, while the portion formerly submerged and partially cooked is exposed to the air. In the flotation method the cooking operation which usually takes approximately two minutes is accordingly divided into two frying operations of approximately one minute each and the uniformity of the cooked product depends upon the accuracy with which the overturning of the doughnut is timed and as this in turn depends upon the composition of the dough including among other variables the quality of the flour and the amount of liquid employed in any given batch of dough, the ultimate product is not perfectly uniform.

The object of this invention is a more uniformly cooked doughnut.

Another object of this invention is to improve the sanitary conditions under which doughnuts are cooked.

Another object of this invention is to reduce the quantity of grease employed to cook the doughnuts as far as practicable.

Other objects will appear from the detailed description.

In the drawings comprising two sheets of five figures numbered Figs. 1 to 5 inclusive one embodiment of the invention is set forth.

Fig. 1 is a top plan view of one form of doughnut machine embodying my invention.

Fig. 2 is a central vertical section of the machine of Fig. 1 taken along the line 2—2 of Fig. 1.

Fig. 3 is a sectional view taken along the line 3—3 of Fig. 1.

Fig. 4 is a detailed view of certain operating parts, and

Fig. 5 is a detailed view partly in section of the ejecting mechanism.

Like reference characters designate corresponding parts throughout the several figures of the drawings.

Referring to Figs. 1 and 2 the device includes a cooking receptacle 10 supported on a suitable framework 11 having a series of supports 12. A spindle 14 is supported in hub 13 and a second support provided by an upper circular rack 35. Spindle 14 is keyed to hub 13 by means of a key 14a registering in a suitable key-way in the hub (not shown), and to upper rack 35 by means of a key 38 likewise registering in a key-way (not shown). The nut 39 serves to clamp hub 13, spindle 14, and upper circular rack 35 together. A revolving head 15 mounted upon spindle 14 is adapted to be driven by a beveled gear 17 which is pressed thereon at 16 and which meshes with a beveled gear 18 (see Fig. 3). Beveled gears 17 and 18 are driven from any suitable source of energy as for example motor 30 (Fig. 2) coupled to a suitable reducing gear box 28 by means of shaft 29. A belt 26 is driven from said reducing gear box by means of a pulley 27 thereby imparting rotary movement to pulley 24 which in turn drives pulley 20 by means of belt 25. Pulley 20 and beveled gear 18 are mounted upon a common spindle 19 threaded into a lug 21 forming a part of bearing 13. Pulley 24 is also mounted upon a spindle 23 threaded in a lug 22 also forming a part of bearing 13.

The revolving head 15 is provided with a plurality of sockets 46 and bearing members 41 (Fig. 3) for receiving the inner and outer ends respectively of shafts 45. The outer ends of the shafts 45 are adapted to receive the sockets 47 of a series of detachable fingers 48 (Fig. 2). These detachable fingers are preferably U shaped, one leg of the U being shorter than the other as indicated at 49 (Figs. 2 and 3). Fingers 48 are made detachable to facilitate cleaning. They may be made of any desired material, or of heat insulating substance such as marbleoid, formica, or durez.

The revolving head 15 causes shafts 45 and fingers 48 to rotate but in rotating fingers 48 are adapted to turn on their associated shafts 45 from the vertical to the angular positions indicated by the dotted lines which are shown in Fig. 4. This may be accomplished in any preferred manner, but as shown in the drawings it is accomplished by a train of spur gears 42—42 and beveled gears 43—43 and 44. Each shaft 45 carries a beveled gear 44 which meshes with upper and lower beveled gears 43 mounted upon a series of upper and lower shafts 55 each journalled in the upper or lower journals 40—40 forming a part of the revolving head 15. Each upper and lower shaft 55 carries an upper or lower spur gear 42, said gears being adapted to mesh with the staggered sets of teeth 35a and 36a of the upper and lower racks 35 and 36 respectively (see Fig. 4). Referring more particularly to Figs. 3 and 4 it should be observed that the upper rack 35 is provided with a plurality of sets of teeth 35a and a plurality of smooth sections 35b; similarly the lower rack 36 is provided with a plurality of sets of teeth 36a and a plurality of smooth sections 36b; it should likewise be observed as best indicated in Fig. 4 that the sets of teeth 36a of the lower rack 36 are staggered with respect to the sets of teeth 35a of the upper rack 35 so that when the upper spur gear 42 is meshing with a set of teeth 35a of upper rack 35 the corresponding lower spur gear 42 is encountering a smooth section 36b of lower rack 36 and is out of mesh with any set of teeth 36a of the said lower rack 36. This is the position shown in bold outline in Fig. 4. Conversely when the upper spur gear 42 is encountering any smooth section 35b of upper rack 35 the lower spur gear 42 will be meshing with one of the sets of teeth 36a of lower rack 36. Accordingly as the revolving head 15 revolves carrying with it the trains of gears 42—42, 43—43 and 44, the upper and lower spur gears 42—42 rotate alternately as they alternately encounter the staggered sets of teeth 35a—36a, thereby alternately rotating beveled gear 44 in a counter-clockwise and then in a clockwise direction. This oscillatory rotary movement of beveled gear 44 causes fingers 48 to turn from the vertical position shown in bold outline in Fig. 4 to the dotted line position, thence back to a vertical dotted line position, thence to an inclined dotted line position, thence back again to a vertical position as again indicated in dotted lines; after which the cycle of operations is repeated so long as upper and lower gears 42—42 are alternately encountering the staggered sets of teeth 35a and 36a. Suitable bolts 37 secure lower rack 36 to framework 11.

Referring to Figs. 1 and 2 any suitable form of doughnut cutter 34 is mounted upon the cooking receptacle 10 by any suitable form of bracket (not shown) and is driven from the reducing gear box by a suitable chain 32 and sprocket 33. The cutter 34 is synchronized with respect to the fingers 48 so that the raw annular formations of dough are deposited by the cutter over the shorter legs 49 of the fingers 48 as each of said legs 49 is in axial alignment with the center of the doughnut forming die outlet of the doughnut cutter 34. In order to insure proper alignment of the short legs 49 of the fingers 48 with the center of the die of the cutter 34 the upper and lower racks 35 and 36 are smooth (teeth being omitted) in those sectors of the racks over which the revolving head 15 carries the upper and lower spur gears 42—42 between the point where the doughnut encounters the upwardly inclining run-way 51 of ejector 53 until after the finger has passed beyond the die forming outlet of the cutter 34. This is best indicated from the plan view (Fig. 1) wherein the smooth section as indicated occupies an angle of approximately 90 degrees; but this angle may be increased or decreased dependent upon the space required by the apparatus for effecting ejection of the cooked doughnuts and the depositing of the uncooked annular formations of dough.

As the doughnuts 50 are carried through the cooking receptacle 10 they are gradually cooked as indicated in the plan view in Fig. 1, in which the direction of rotation is assumed to be counter-clockwise, the uncooked annular formation being deposited by cutter 34 at the point which would be indicated by the numeral 3 on a clock dial, the uncooked annular formations being indicated at the points which would be occupied by the numerals 2 and 1 on a clock dial. As the doughnuts 50 progress in a counter-clockwise direction they gradually cook until when they reach the point which would be indicated by the numeral 5 on a clock dial they are fully cooked and the continued counter-clockwise movement of finger 48 causes the doughnut to encounter the upwardly inclining run-way 51 of the ejector 53 which tends to lift the doughnut until when the finger 48 reaches the point which would be indicated by the numeral 4 on a clock dial the doughnut is completely disengaged from the short leg 49 of the finger 48 and is guided down the downwardly inclined run-way 52 of ejector 53 and is deposited in any suitable receptacle 54 such as a wire basket (see Figs. 1 and 5).

The principle of operation is as follows: The uncooked annular formations of dough are deposited upon the short legs 49 of the fingers 48 in succession and are carried in a counter-clockwise direction until the upper and lower spur gears 42—42 alternately mesh with the sets of teeth 35a and 36a of upper and lower racks 35 and 36 respectively. As the upper spur gears 42 engage the sets of teeth 35a the upper beveled gears 43 act upon beveled gears 44 to cause the fingers 48 to be inclined or tilted causing the short leg 49 of each finger 48 to press lightly upon the surface of the ring of dough encircling leg 49 thereby tending to tilt the annular formation of dough and submerge one sector of the ring while at the same time tending to lift the other sector of the ring out of the hot liquor. When the upper spur gears 42 carried by the revolving head 15 encounter the smooth sections 35b of upper rack 35 the lower gears 42 will be in mesh with the sets of teeth 36a of the lower rack 36 and will cause the associated lower beveled gear 43 to rotate beveled gear 44 in the opposite direction thereby causing the fingers 48 to first resume the vertical position and then turn until they are inclined in the opposite direction whereby the pressure of the legs 49 upon the surface of the doughnuts 50 will tend to incline the doughnuts in the opposite direction to submerge complementary sectors of each of the said doughnuts while lifting the sectors formerly submerged above the grease level. This continued tilting and counter-tilting of the doughnuts constitutes in effect a rocking motion whereby complementary sectors of the doughnuts are alternately dipped in the frying liquor to cook them and raised above the frying liquor to "breathe" and to permit the grease to drain therefrom. In this manner the doughnut is more uniformly cooked resulting in a more uniform product.

It should be observed that no part of the mechanism except the fingers 48 is in contact with the hot grease or frying liquor and that said fingers 48 are detachable as the sockets 47 of said fingers 48 are merely in frictional engagement with the ends of the shafts 45. The fingers are accordingly readily detached for cleaning purposes. If said fingers 48 are made of a heat insulating material the heat losses will be very substantially reduced because only a very small quantity of heat will be transmitted to the moving parts.

It should also be observed that the cooking receptacle 10 is comparatively small in width and relatively shallow thereby materially reducing the quantity of grease required to provide sufficient cooking liquor. This is a distinct advantage because it is desirable that the cooking liquor shall be substantially replenished and the smaller the quantity of grease required to permit efficient operation of the cooking receptacle the more nearly will the replenishment of the grease necessarily consumed during the cooking operation approach to a 100% replacement. Moreover the use of a small cooking receptacle reduces the quantity of grease to be discarded as waste matter whenever it is deemed advisable to completely replace the used grease.

What is claimed is:

1. In a doughnut machine and in combination, a cooking receptacle for containing frying liquor, and gear controlled mechanism operable to tilt the doughnuts to variously submerge them by sectors in the frying liquor and to convey them through the receptacle during the cooking operation.

2. In a doughnut machine and in combination, a cooking receptacle for containing frying liquor, gear controlled mechanism operable to tilt the doughnuts to variously submerge them by sectors in the frying liquor and to convey them through the receptacle during the cooking operation, and means for removing the doughnuts from the receptacle after cooking is completed.

3. In a doughnut machine and in combination, a cooking receptacle for containing frying liquor, a plurality of fingers for receiving the uncooked doughnuts in succession and for conveying them through the cooking receptacle, an upper rack, a lower rack, means engaging with the upper rack to tilt said fingers in one direction to cause them to submerge one sector of each doughnut for a certain predetermined length of time, and means engaging with the lower rack to tilt said fingers in the opposite direction to cause them to submerge the complementary sector of each doughnut for a certain predetermined length of time.

4. In a doughnut machine and in combination, a cooking receptacle for containing frying liquor, a plurality of fingers for receiving the uncooked doughnuts in succession and for conveying them through the cooking receptacle, and means for alternately turning and returning said fingers to cause them to submerge varying sectors of each of said doughnuts in the frying liquor during their progress through the cooking receptacle.

5. In a doughnut machine and in combination, a cooking receptacle for containing frying liquor, a plurality of fingers for receiving the uncooked doughnuts in succession and for conveying them through the cooking receptacle, an upper rack, a lower rack, means engaging with the upper rack to tilt said fingers in one direction to cause them to submerge one sector of each doughnut for a certain predetermined length of time, means engaging with the lower rack to tilt said fingers in the opposite direction to cause them to submerge the complementary sector of each doughnut for a certain predetermined length of time, and means for removing the doughnuts from the receptacle after cooking is completed.

6. In a doughnut machine and in combination, a cooking receptacle for containing frying liquor, a plurality of fingers for receiving the uncooked doughnuts in succession and for conveying them through the cooking receptacle, means for alternately turning and returning said fingers to cause them to submerge varying sectors of each of said doughnuts in the frying liquor during their progress through the cooking receptacle, and means for removing the doughnuts from the receptacle after cooking is completed.

7. In a doughnut machine and in combination, a cooking receptacle for containing frying liquor, a plurality of fingers for receiving the uncooked doughnuts in succession and for conveying them through the cooking receptacle, upper and lower racks each having a plurality of spaced sets of teeth thereon, the spaces between said sets of teeth being smooth, said racks being so staggered that the sets of teeth of each rack are in vertical alignment with the smooth spaces of the complementary rack, a plurality of gear trains, there being one train associated with each of said fingers, said gears being operable in engagement with the rack teeth to swing said fingers to and fro, and means to convey said fingers through said cooking receptacle and to cause said gear trains to engage said rack teeth to operate said fingers.

8. In a doughnut machine and in combination, a cooking receptacle for containing frying liquor, a plurality of fingers for receiving the uncooked doughnuts in succession and for conveying them through the cooking receptacle, upper and lower racks each having a plurality of spaced sets of teeth thereon, the spaces between said sets of teeth being smooth, said racks being so staggered that the sets of teeth of each rack are in vertical alignment with the smooth spaces of the complementary rack, a plurality of gear trains there being one train associated with each of said fingers, said gears being operable in engagement with the rack teeth to swing said fingers to and fro, means to convey said fingers through said cooking receptacle and to cause said gear trains to engage said rack teeth to operate said fingers, and means for removing the doughnuts from the receptacle after cooking is completed.

9. In a doughnut machine and in combination, a cooking receptacle for containing frying liquor, a plurality of fingers for receiving the uncooked doughnuts in succession and for conveying them through the cooking receptacle, upper and lower racks each having a plurality of spaced sets of teeth thereon, the spaces between said sets of teeth being smooth, said racks being so staggered that the sets of teeth of each rack are in vertical alignment with the smooth spaces of the complementary rack, a plurality of gear trains there being one train associated with each of said fingers one gear of each of said trains being operable in engagement with the teeth of the upper rack to cause the associated finger to be swung on one direction and another gear of each of said trains being operable in engagement with the teeth of the lower rack to cause the associated finger to be swung in the opposite direction, and means to convey said fingers through said cooking receptacle and to cause said gear trains to engage said rack teeth to operate said fingers.

10. In a doughnut machine and in combination, a cooking receptacle for containing frying liquor, a plurality of fingers for receiving the uncooked doughnuts in succession and for conveying them through the cooking receptacle, upper and lower racks each having a plurality of spaced sets of teeth thereon, the spaces between said sets of teeth being smooth, said racks being so staggered that the sets of teeth of each rack are in vertical alignment with the smooth spaces of the complementary rack, a plurality of gear trains there being one train associated with each of said fingers one gear of each of said trains being operable in engagement with the teeth of the upper rack to cause the associated finger to be swung in one direction and another gear of each of said trains being operable in engagement with the teeth of the lower rack to cause the associated finger to be swung in the opposite direction, means to convey said fingers through said cooking receptacle and to cause said gear trains to engage said rack teeth to operate said fingers, and means for removing the doughnuts from the receptacle after cooking is completed.

ADOLF HAWERLANDER.